United States Patent [19]

Bouder

[11] 4,120,614

[45] Oct. 17, 1978

[54] HAND BICYCLE PUMP WITH PRESSURE PRESELECTION AND DISPLAY MEANS

[75] Inventor: Paul C. Bouder, Soisy-sous-Montmorency, France

[73] Assignee: Etablissements Poutrait-Morin S.A., Aubervilliers, France

[21] Appl. No.: 819,678

[22] Filed: Jul. 27, 1977

[30] Foreign Application Priority Data

Jul. 30, 1976 [FR] France ............................... 76 23309
Jun. 9, 1977 [FR] France ............................... 77 17631

[51] Int. Cl.² ...................... F04B 21/00; F04B 49/00; F16K 15/20
[52] U.S. Cl. ...................................... 417/63; 417/284; 417/296; 137/226; 137/227
[58] Field of Search ................ 417/284, 63, 296, 311, 417/313, 469, 454, 520; 137/226, 227

[56] References Cited

U.S. PATENT DOCUMENTS

| | | | |
|---|---|---|---|
| 909,373 | 1/1909 | Desmond | 417/311 |
| 1,434,708 | 11/1922 | Kelsey | 137/226 |
| 1,455,646 | 5/1923 | Milland | 417/311 |
| 1,999,655 | 4/1935 | Coyle | 417/520 |
| 3,000,396 | 9/1961 | Davis | 417/311 |
| 3,056,538 | 10/1962 | Owsen | 417/311 |
| 3,131,646 | 5/1964 | Parrott | 417/454 |
| 3,981,625 | 9/1976 | Wickenberg | 417/524 |

FOREIGN PATENT DOCUMENTS

382,078 2/1922 Fed. Rep. of Germany ........... 417/311

*Primary Examiner*—William L. Freeh
*Attorney, Agent, or Firm*—Charles E. Brown

[57] ABSTRACT

A hand bicycle pump of generally cylindrical configuration essentially comprising a pump body adapted to be reciprocated on a pump rod. An air circulation chamber communicates at one end through the compression piston with the compression chamber in the pump body and at the other end via a check valve with a connector adapted to couple temporarily the pump to an inflation valve of an inflatable body, e.g. a tire. The desired inflation pressure is preselected by rotating a sleeve, accessible from outside the pump, having an index, relative graduations along a slot in the pump body. The sleeve varies the spring force exerted against one end of a piston control member, the other end of which is subjected to the pressure inside the inflatable body so that once the desired pressure is reach the control member is displaced axially to bring the compression chamber into communication with the atmosphere. In one embodiment valving is effected by a valve control member which embodies the control member too, and in another embodiment the air circulation tube is axially moveable and a valve disc is provided at the end thereof closest the compression chamber for interrupting communication when the desired pressure is reached. In both embodiments pumping pressure is partially compensated for to prevent untimely communication between the compression chamber and the atmosphere when the pump is reciprocated faster than air can be admitted to the inflatable body.

20 Claims, 8 Drawing Figures

HAND BICYCLE PUMP WITH PRESSURE PRESELECTION AND DISPLAY MEANS

BACKGROUND OF THE INVENTION

The present invention relates generally to portable or hand bicycle pumps.

U.S. Pat. No. 3,907,041, issued on Sept. 23, 1975, assigned to the assignee of the present application, describes a hand bicycle pump equipped with means adapted to indicate the pressure in the tire in the course of inflation.

This means is accommodated in a longitudinal cylindrical boss integral with the parallel to the pump body and essentially comprises a piston having a graduated scale displaceable in a viewing window in response to the pressure present inside the tire with which it is in communication.

In the assignee's French Printed Patent Application No. 2,271,417 published on Dec. 12, 1975, there was proposed a hand pump of the aforesaid type, however, in this pump one end of the pump piston rod carrying the compression piston is provided with a hand grip having a connector adapted for an inflation valve so that during inflation the pump body is reciprocated along the pump piston rod. In this construction the pressure indicator is housed inside the compression piston rod.

In the two cases just briefly described the pump provides an indication of the pressure inside the tire. Hence in these two types of pump it is necessary to inflate the tire virtually by trial and error and to take readings of the pressure frequently.

The operator therefore must be attentive during inflation to see to it that the desired pressure has not been reached, failing that other steps have to be taken to readjust for overpressure.

In U.S. Pat. No. 1,394,494 an air pump is disclosed including a safety valve which, in response to a pressure exceeding a pressure preselected by an adjustable spring, is urged to its open position. In this construction the safety valve is not readily accessible from outside the pump and it therefore requires dismounting, should the pressure exerted by the adjustable spring need to be changed.

It is thus immediately apparent that such an arrangement is inapplicable to hand bicycle pumps owing to the fact that tires must be inflated to different pressures as recommended by manufacturers.

U.S. Pat. No. 1,455,646 discloses an air pump which is manually operable but which is of an entirely different variety than the compact cylindrical bicycle pumps which are adapted to be carried on a bicycle frame. This patent discloses a means for setting the desired pressure to which an inflatable body is to be blown up but the means are not at all adapted to the pumps of the foregoing variety.

SUMMARY OF THE INVENTION

The present invention has an object the provision of a hand or portable bicycle pump of cylindrical configuration which can be readily set for various inflation pressures so that an inflatable body, such as a tire, may be blown up to a preselected pressure without having to interrupt pumping or take pressure readings.

According to the invention there is provided a hand bicycle pump generally of elongate cylindrical configuration comprising a pump rod mounting a compression piston and a pump body having air inlet means and displaceable along said pump rod and defining a compression chamber with said compression piston, an air circulation tube disposed inside said pump rod and communicating at one end with said compression chamber and at the other end with means for temporarily coupling said pump to an inflatable body, pressure preselection and display means accommodated in said pump rod around said air circulation tube and accessible from outside said pump, said pressure preselection and display means adapted to vary the spring force of spring means normally biasing a piston control member towards its inflating position, said piston control member adapted to be in communication with the pressure inside the inflatable body through said coupling means, whereby in response to pressure in the inflatable body exceeding said preselected pressure said piston control member is urged away from its inflation position against the biasing force of said springmeans, and valve means responsive to displacements of said piston control member for bringing said compression chamber into communication with the atmosphere when the pressure inside the inflatable body exceeds the preselected pressure.

The practical interest of the invention will be immediately recognized from the standpoint of use compared with known hand bicycle pumps.

Not only does the pump according to the invention permitthe adjustment of the pressure to which a particular inflatable body is to be inflated which varies according to the body and the use — the recommended pressure of bicycle tires, for instance, varies depending different conditions — but it also facilitates pumping because once the pressure has been set, by adjusting the pressure preselection and display means, the operator need not interrupt pumping to measure the pressure in the tire but merely continues to pump until the preset pressure has been reached, the drop in resistance to his pumping action and the consequent sound of air escaping to the atmosphere being sensed.

According to a preferred embodiment the air circulation tube is secured at one end to a compression piston support member and provided at the other end with a check valve, said pressure preselection and display means comprising a sleeve mounted for rotation around said air circulation tube on a threaded liner associated with said compression piston support member, said spring means bearing against said sleeve at one end and said piston control member at the other end, the inflation position of said piston control member being defined by said check valve body which forms an abutment therefor, said valve means and said piston control member both being embodied in a piston valve member adapted to bring a port in said air circulation tube into communication with a vent in said pump rod communicating with the surroundings once the preselected pressure has been reaced.

According to another preferred embodiment, said valve means comprises a valve disc fixed to said one end of said air circulation tube and a valve body fitted inside said pump rod and having a valve seat, said air circulation tube being secured at its other end to said piston control member which, therefore, is connected to said valve disc by said air circulation tube which in this case is mounted for axial displacements with said piston control member.

Both embodiments permit precision inflation pressures which are made possible by means which are not subjected to any excessive stresses which might interfere with the operation of the pump.

The aforesaid embodiments are also preferably provided with means for precluding an untimely escape of pump air due to very fast pumping action by the operator which might otherwise cause a flow rate exceeding the intake capacity of the inflation valve with which the inflatable body is fitted.

These and other features and advantages of the invention will become apparent from the following description, given by way of example with reference to the accompanying drawings.

DESCRIPTION OF THE PREFERRED EMBODIMENTS

The hand held, portable bicycle pump comprises a pump body 10 provided, at one end, with a hand grip 11 and is closed off at its other end by an end member 12 adapted to permit the clearance with the so-called pump or compression piston rod 13; the hollow pump rod 13 carries at one end a compression piston 14 fitted in the usual manner inside the pump body, and at its opposed end a hand grip 15 on which is mounted a connector which is preferably of the quick coupling variety such as disclosed in U.S. Pat. No. 3,926,205 (GOURLET), also assigned to the assignee of the present application.

In the present pump, inflation is produced by reciprocating the pump body 10 along the pump rod 13.

The compression piston 14 is secured at the end the pump rod 13 for movement therewith (see FIGS. 3 and 4 in particular) by means of a piston support member 18 having a protruding portion 18A on which the pump rod is secured by annular crimped zones 18B, and a body spring 19 is in engagement at one end with the piston support member 18, the opposite end of the spring 19 being free.

The piston support member 18 comprises an axial passageway 18C having an extension 18A, a tapped bore 18D in which an end of an air circulation tube 20 is threadedly engaged, the other end of the air circulation tube being threadedly engaged in an apertured check valve body 21 which accommodates ball valve member 22 which cooperates with a seat 23 defined in said other end of the air circulation tube 20, forming a check valve designated generally by reference numeral 25.

Figure 1:
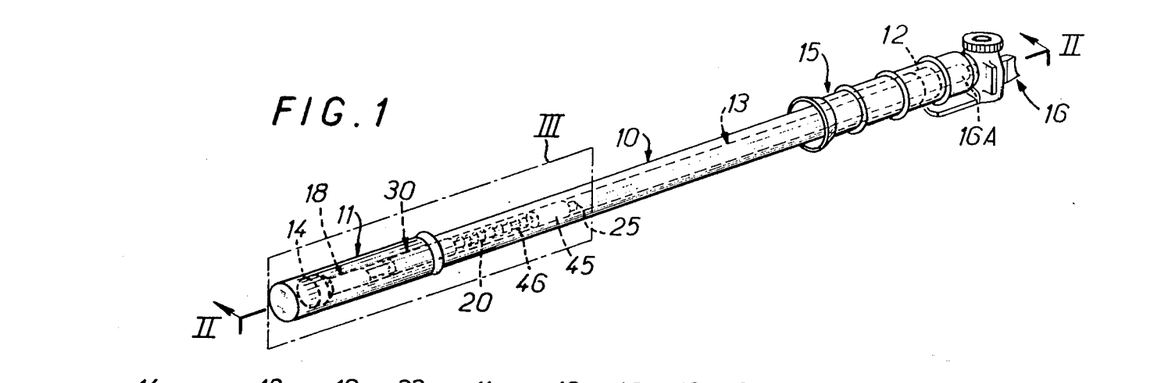
FIG. 1 shows a perspective view of a pump embodying the present invention, in its rest position.
Figure 2:
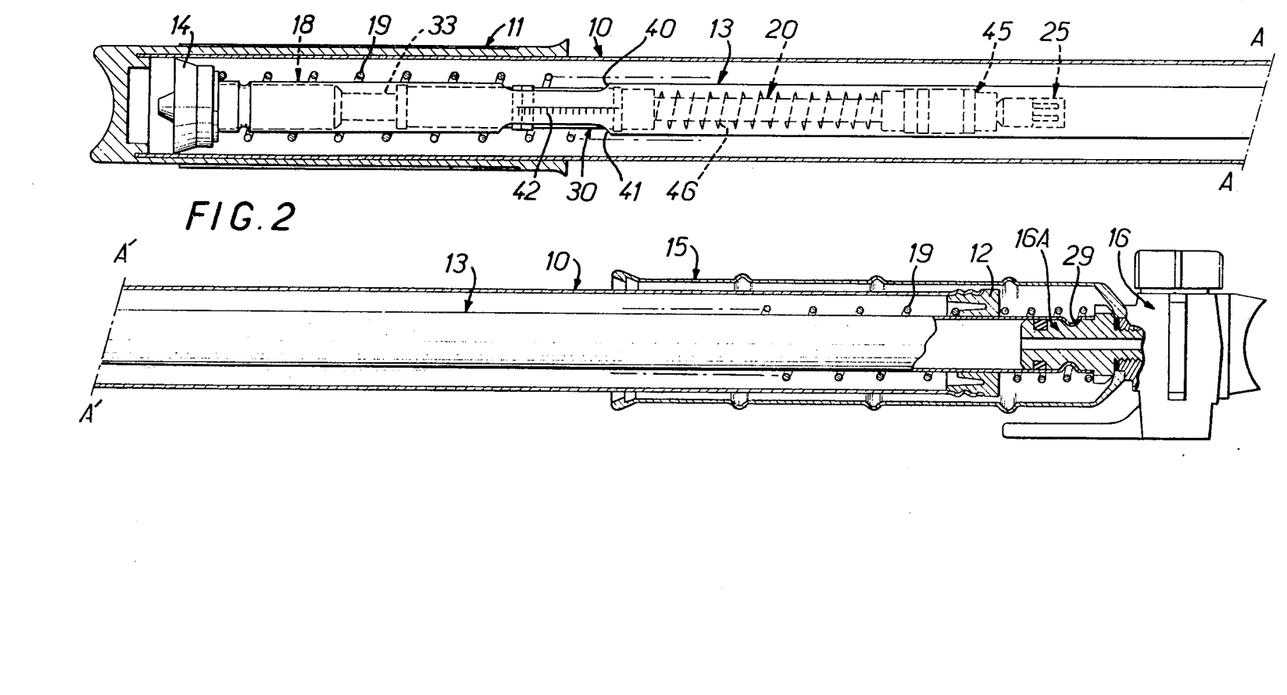
FIG. 2 is an axial cross-sectional view of the pump taken along the line II—II in FIG. 1; this view is divided into two parts which are in reality, joined along coincident lines A—A and A'—A'.

The pump rod 13 is joined at the air discharge end by crimped zone 29 (FIG. 2) on a protruding portion 16A of the quick-coupling connector 16, the hand grip 15 being held captive between these two parts: portion 16A and connector 16 respectively.

The air circulation tube 20 extends inside the pump rod 13 through movable assembly, which is also housed in the pump rod 13, which will now be described in greater detail with respect to FIGS. 3–6 in particular.

The aforesaid assembly comprises pressure preselection and display means including a sleeve 30 having an axial bore 31 with a tapped section 32, the tapped section 32 in adapted to be screwed into a hollow rod 33 externally threaded at 33A, rigidly connected to the protruding portion 18A of the piston support member 18.

The outer surface of the sleeve 30 is provided with knurling or score lines 30A, 30B at opposite ends of a smooth cylindrical central zone 30C having a circumferential line 30D whose function will become apparent from the description of the operation of the present pump.

The above-mentioned sleeve 30 must therefore be displaced axially along the air circulation tube 20 by rotation; the fluid-tightness between the pump tube and the sleeve 30 is afforded by means of an annular seal 36 held in place by a washer 37 and the fluid-tightness between the sleeve 30 and the inner wall of the piston support member is produced by means of a seal 38, e.g. with lips.

The pump tube 13 has at least one, and preferably two diametrically opposed viewing slots 40, 41 which extend axially and have at least one edge provided with a graduated scale 42.

The air circulation tube 20 is also fitted with a piston control member indicated generally by reference numeral 45 between its free end, i.e. proximate to the check valve 25, and the aforesaid sleeve 30.

The piston control member 45 in the present embodiment is comprised of a piston or spool valve member and normally urged in abutment against the apertured check valve body 24 by means of an adjustable spring 46 the ends of which bear against a corresponding end of said sleeve 30 and an end of the said piston valve member, respectively.

The piston valve member is provided at its outer ends with sealing members 49, 50 adapted to cooperate with the inner wall of the pump tube 13, and an axial passageway 51 formed in the piston valve member has two sealing members 52, 53 adapted to cooperate with the outer surface of the air circulation tube 20.

The just-mentioned axial passageway 51 is arranged to provide, between the sealing members 52, 53, in combination with the outer wall of the air circulation tube 20, a first annular chamber C1, and between the sealing members 49, 50 the outer surface of the piston valve member comprises a depression defining with the inner wall of the pump piston rod 13 a second annular chamber C2. The chambers C1 and C2 are brought into communication through the radial ports 56. The air circulation tube 20 comprises, between sleeve 30 and piston valve member 45, radial ports 60 adapted to bring the interior of the air circulation tube 20 into communication with the chamber C3 formed between the sleeve 30 and the piston valve member 45 and in which is accommodated an adjustable spring 46 having a predetermined spring force.

The air circulation tube 20 also comprises, in the region of the piston valve member 45, at least one port 61 and the hollow pump rod also comprises in this same region a port or vent 62; the function of these ports will become apparent from the following description of the operation.

Figure 3:
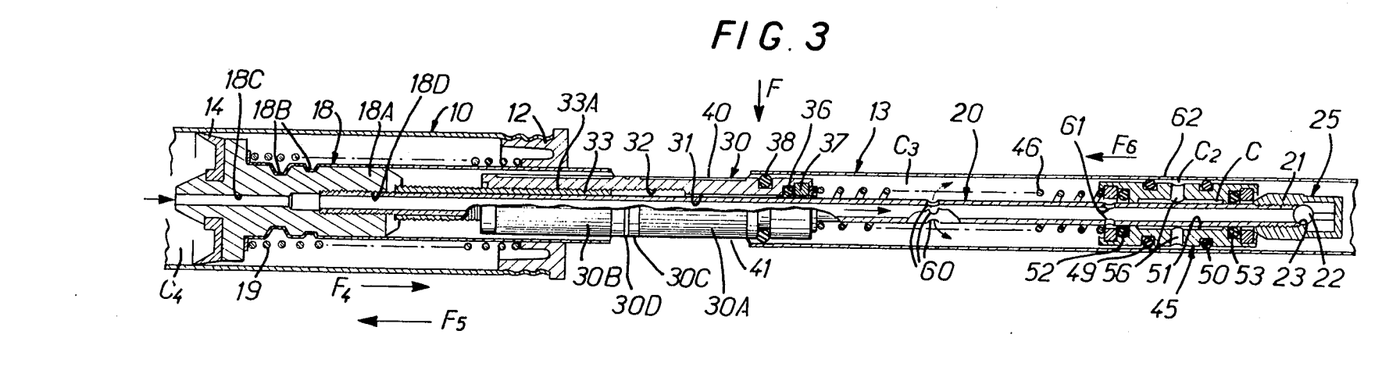
FIG. 3 shows, on enlarged scale, the part of the pump boxed in phantom lines III in FIG. 1.
Figure 4:
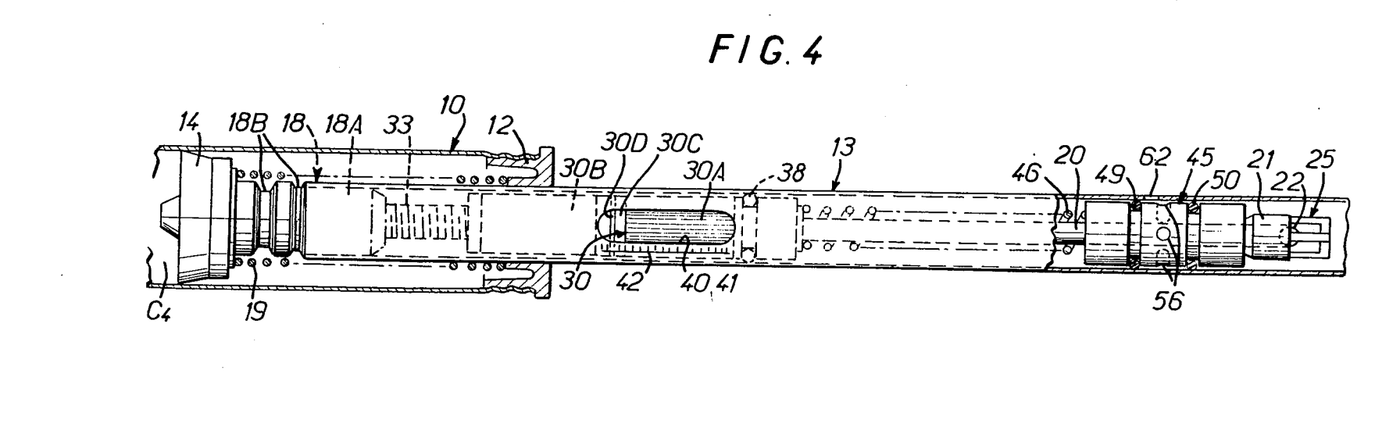
FIG. 4 is a plan view of the part of the pump shown in FIG. 3, viewed in the direction of the arrow F.
Figure 5:
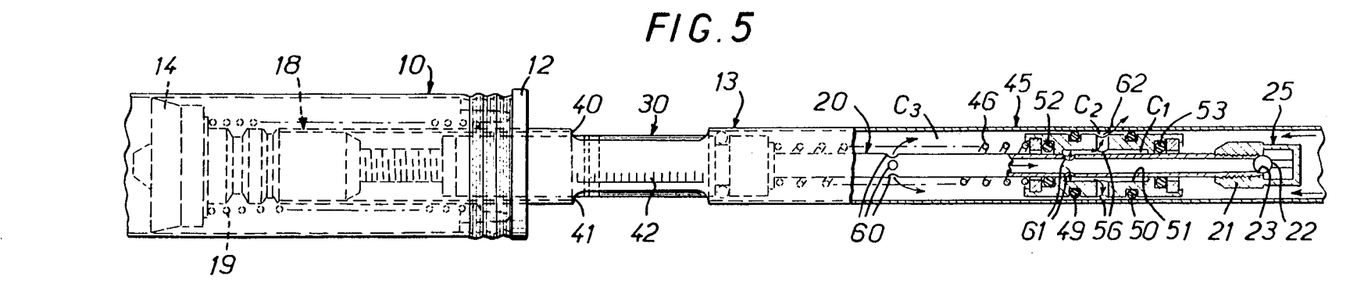
FIG. 5 is a view taken in the direction of arrow F1 in FIG. 4, piston control member being in its position where air is bypassed to the surroundings.
Figure 6:
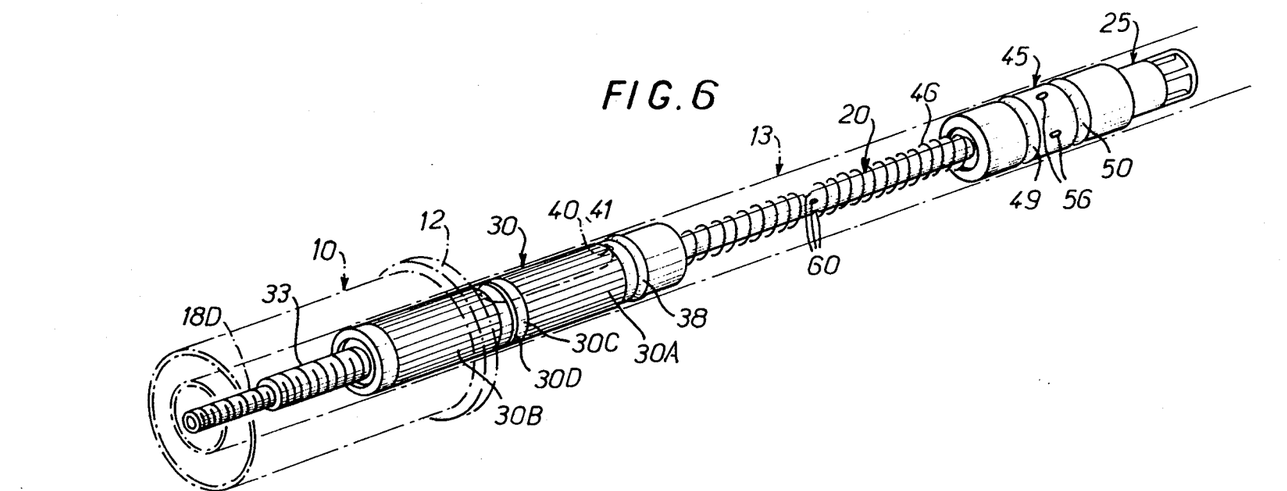
FIG. 6 is an enlarged perspective view of the movable assembly of FIGS. 1–5.

To begin with, the pump body 20 is slid along the pump rod 13 so as to uncover the pressure display means, that is, the sleeve 30, as illustrated by FIGS. 3–5.

The desired pressure to which the tire or other inflatable object is to be inflated is set by turning the sleeve 30 in order to bring the circumferential line 30D defining a pointer or index into position facing a corresponding graduation on graduated scale 42.

The rotation of the sleeve is facilitated by the score lines or knurling 30A, 30B thereon, and it is readily accessible owing to the presence of the diametrically opposed viewing slots 40, 41; the rotation of the sleeve 30 causes the gradual compression of the adjustable spring 46 since the piston valve member 45 is in a stable position in abutment against the apertured check valve body 21.

In this position of the piston valve member 45 the ports 61 and 63 formed in the air circulation tube 20 and the piston support member 13, respectively, are isolated from each other by the sealing member 52.

After putting the connector 16 into position on an inflation valve (not illustrated) of a tire or other inflatable body, the pump body 10 may be reciprocated in the usual manner such that the air delivered under pressure issuing from the compression chamber C4, defined by the pump body 10 and the compression piston 12, passes into the air circulation tube 20, fills the chamber C3 through ports 60, unseating the ball valve member 22 of the check valve, and is supplied to the tire through the quick coupling connector.

Thus, during the delivery phase the pressure of the air is equal throughout, whether it is upstream or downstream of the piston valve member 15, relative to the direction of flow compressed air, thanks to the ports 60 which put the interior of the air circulation tube 20 with the chamber C3. The ends of the piston valve member 45 having the same surface area, the forces exerted thereaginst balance each other and the spool or piston valve member is held stationary in its forward position in abutment against the apertured check valve body 21.

The pump body 10 is reciprocated back and forth as long as the desired pressure has not been reached.

During the suction or aspiration stroke air is drawn into the pump body (arrow F5) to fill the compression chamber C4 through an air inlet (not illustrated, defined in the end member 12) and by the deformationof the sealing member 14 on the compression piston during the aspiration of air), pressurized air downstream of the spool or piston valve member, that is to say, between the inflation valve and the spool or piston valve member, is held captive by the closing of the check valve 25, the valve ball member 22 being thrust against its seat 30 under the effect of pressurized air.

During the suction or aspiration stroke the air in the annular chamber C3 of the air circulation tube 20 is expelled into the pump body 10.

After filling the compression chamber C4 with air, another compression stroke may be carried out, and so on.

When the desired pressure in the tire has been reached corresponding to the value selected by the position of the pressure preselecting and display means, the pressure inside the tire thrusts the ball valve member 22 against its seat 23 and exerts a force due to the pressure against the cooresponding end of the spool or piston valve member 45; this force which is greater than the spring force due to spring 46, causes an axial displacement of the spool or piston valve member in the direction shown by arrow F6.

In the course of the displacement of the spool or piston valve member 45, the ports 61 and 62 come into communication with the surroundings via chambers C1, C2 and radial apertures 51, as clearly shown in FIG. 5.

At this point, assuming the operator continues to reciprocate the pump body 10 drawing air in and deliverying compressed air, the compressed air will no longer be admitted into the tire but bypassed to the atmosphere instead, owing to the position of the spool or piston valve member 45 as long as the pump has not been disconnected from the inflation valve of the tire, the spool or piston valve member 45 being held in this position by the pressure downstream thereof, which pressure at this point is substantially equal to the pressure inside the tire being pumped.

Once the pump has been disconnected from the inflation valve of the tire the pressure downstream of the spool or piston valve member 45 drops and this automatically brings it to its initial position in abutment against the check valve body due to the force of the spring 46.

It will be noted that in case the operator pumps too fast the air cannot enter the tire at the same rate because the orifice of the inflation valve only permits a limited intake flow rate. Temporarily a large overpressure would ensue in the space included between the check valve 24 and the inflation valve; this overpressure would cause the untimely displacement of the spool or piston valve member and thereby would bring the compressed air into communication with the surroundings thus making the inflation impossible. It will be readily understood that such an effect would be undesirable as it is liable to cause very substantial errors between the reading of the displayed pressure value and the actual pressure in the tire.

This drawback is overcome by the present pump owing to the presence of the port(s) in the air circulatin tube which distributes the compressed air to the chamber C3 as well as downstream of the spool or piston valve member thereby maintaining the ends of the same pressure.

Hence, if, in the process of reciprocating the pump body 10, the desired pressure is reached downstream of the spool or piston valve member 45, it will be urged for axial displacement (arrow F6) by this pressure and the air circulation tube 20 will be brought into communication with the piston valve member; the axial displacement of the spool or piston valve member is allowed because during the aspiration of air the annular chamber C3 is no longer under the pressure of the air therein because it will be exhausted through ports 60 in the chamber C3 into the air circulation tube then into the compression chamber C4.

The above described embodiment is thus entirely satisfactory in that when the desired pressure is attained in the tire, the admission of pressurized air is halted by bringing the pressurized air into communication with the surroundings.

Nevertheless trials have revealed that the accuracy of the acutal pressure compared with the preselected pressure left something to be desired and could vary 0.5 bar from one pump to another, such deviations caused by the spool or piston valve member and more particularly the sealing members provided thereon; the manufacturing tolerances of these sealing members may lead to variable coefficients of friction differing in not insubstantial proportions.

The inventor therefore attempted to reduce the deviations observed up to now so as to obtain precision in the actual pressure to which the tire is inflated as high as possible and which hardly varies from one pump to another.

Figure 7:
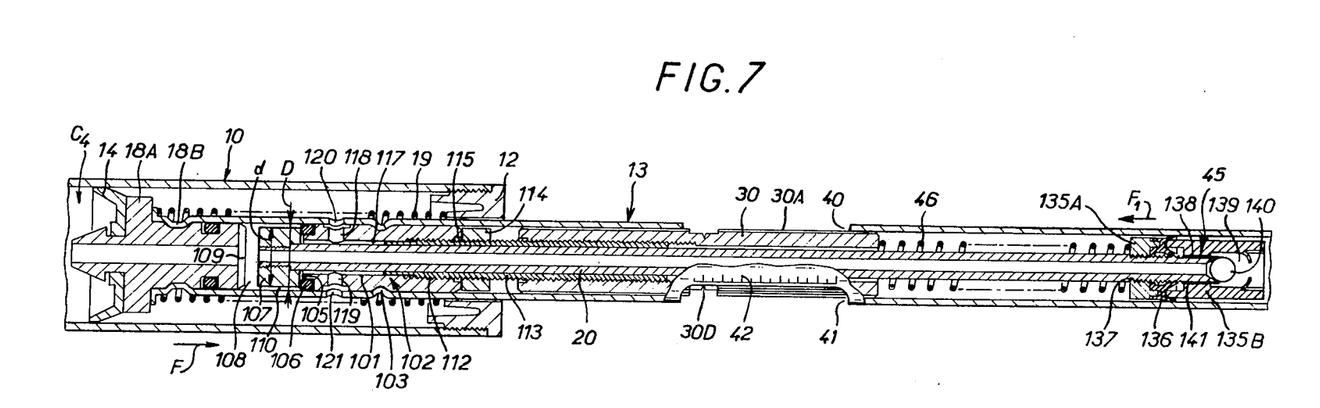
FIG. 7 is a fragmentary axial sectional view of another embodiment of the pump embodying the present invention.
Figure 8:
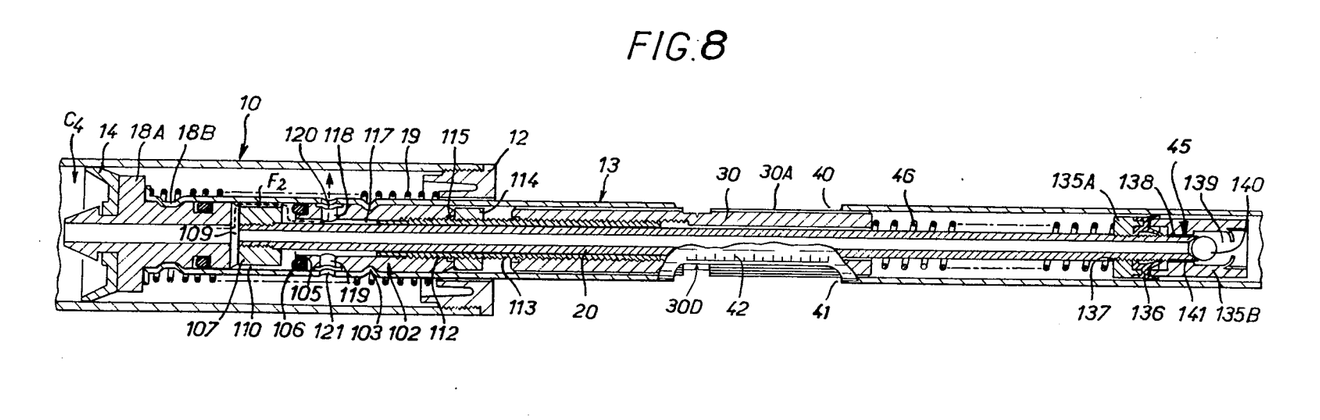
FIG. 8 is a view similar to that of FIG. 7 in another position in which air is prevented from entering the body being inflated.

Reference is now made to the embodiment of FIGS. 7 and 8 in which similar parts are designated by the same references as the preceding embodiment and the air circulation tube 20 is slidably mounted inside the pump rod 13; the tube 20 has an end portion which is engaged in an axial passage 101 formed in a valve body generally designated by reference numberal 102, the valve body 102 being fixed to the pump rod 13 proximate to the piston support member 18A by a crimped zone 103.

The valve body 102 is arranged at its forward end 105 to provide a valve seat 106, a valve member or disc 107 hermetically connected to the corresponding end of the air circulation tube 102. The valve disc 107 is disposed in a chamber 108 formed between a rear end 109 of the piston support member 18A and the corresponding end 105 of the valve body 102.

the valve disc 107 has a diameter $d$ smaller than the inner diameter D of the rod 13 so that an annular space is arranged between the valve disc and the pump rod 13.

The aforesaid axial passage 101 has a greater diameter than the outer diameter of the air circulation tube and is threaded, at 112, along part of its length in order to threadedly receive a bushing 113 held against movement by a locknut 114.

The annular axial passageway 117 is thus formed between the air circulation tube 100 and the valve body into which passageway preferably two radial apertures 118, 119 in the valve body run, the radial apertures 118, 119 being located opposite the ports 120, 121 formed in the pump rod 13.

With the bushing 113 there is associated by threaded engagement means for displaying the desired pressure, comprising a sleeve 30 with external knurling or score lines 30A and accessible through two diametericaly opposed slots 40, 41 provided in the pump rod 13.

The sleeve has in a central area an index 129 in the form of an circumferential groove or line adapted to be brought into facing position with respect to any one of the graduations on the graduated scale 42 along each edges of the slots 40, 41.

At the other end the air circulation tube 20 threadedly receives a control member 45 for the valve disc comprising a piston valve member 45 including two component parts 135A, 135B between which a lipped sealing member 136 is clamped.

The first part 135A is in abutment against a shoulder 137 formed on the outer surface of the air circulation tube 20, the second part 135B is connected to the pump tube by a threaded and glued bearing member 138. Part 135B forms a housing 139 for a ball check valve member 140 adapted to cooperate with a valve seat 141 in the end of the air circulation tube so as to define a check valve.

One end of a spring 46 bears against a corresponding end of the piston valve member, more precisely the first part 135A thereof, while the other end of the spring bears against an end of the sleeve 30.

The operation of the just-described embodiment will now be analyzed.

As the pump rod 13 is coupled at an end remote from the piston valve member 14 by a suitable connector to an inflation valve of an inflatable or tire (not shown), the pump body 10 reciprocates back and forth along the pump rod 13.

The preselection of the desired pressure of the tire is achieved by rotating the sleeve 30 in one direction or the other, depending on whether greater or less pressure is required, which in turn causes the spring 46 to be compressed or extended thereby exerting a greater or lesser force on the control member 45. By this adjustment the spring force of the spring 46 is set at a value corresponding to the desired pressure which is then displayed by the position of the index 30D in relation to the graduations 42.

During the delivery stroke the pump body is displaced in the direction of the arrow F and the air under pressure in the compression chamber passes successively through the piston support member, filling the annular space 108, into the air circulation tube 20, urging the ball member 140 of the check valve, and is admitted into the tire via the connector coupled to the inflation valve thereof.

When the delivery stroke comes to an end, that is, when the pump body 10 has moved completely to the right, as illustrated, and overlies the entire length of the pump rod 13, the ball member 140 is thrust against its seat 141 by the pressure prevailing inside the tire and in the space between the check valve and the tire, since the inflation valve is automatically held open by the connector; pressure equal to that inside the tire is therefore also exerted against the end of the control member 45 relatively proximate to the tire.

Following the delivery stroke, the suction or aspiration stroke is effected by the displacement of the pump body 10 in the opposite direction; during this stroke the air inside the annular space 108 is expelled inside the pump body.

In the course of pumping, once the pressure in the space between the tire and the control member 45 becomes greater than the spring force of the spring 46 the control member 45 is urged in the direction of arrow F1 (FIG. 2) displacing with it the air circulation tube 20 and the valve disc 107 associated therewith; the valve disc 107 is thus moved away from its seat 106 and air under pressure coming from the compression chamber C4 is no longer conveyed to the tire but escapes to the atmosphere, along a flow path designated by arrow F2, i.e., through annular passageways 110, 117 and apertures 118, 119 and ports 120 and 121.

Should the reciprocating movements of the pump body continue, the compressed air delivered will not be conveyed to the tire owing to the position of the piston control member and its associated valve disc but will escape to the surroundings whereby the operator will sense that there is no longer any compression of air so as to signal to him that the desired tire pressure has been reached.

It should be noted that the friction caused by the moving parts is kept to a strict minimum because the movable assembly comprising the control member, air circulation tube and valve disc includes only a single sealing member, here the lipped sealing member 136, provided on the piston control member 45. Exceptional precision in the actual pressure of inflation is thus obtained; indeed, in the course of numerous trials the precision of the actual pressure of inflation recorded was in the order of 0.1 bar.

Inflation valves fitted on tires are constructed to admit limited amounts of compressed air. If fast reciprocating action of the pump body were produced, the flow path between the connector and the piston control member would be sealed off. This would cause the displacement of the control member in the direction of the arrow F1 thereby putting the pump effectively out of order, the movable assembly being in the position depicted in FIG. 8.

One of the preferred features of the present as well as the previous embodiment of the invention is to eliminate this drawback irrespective of the speed of reciprocation of the pump body 10.

During each delivery stroke of the pump the pressure in the annular space 108 is exerted against the valve disc 107 which is held in its closed position against the valve seat 106 by the spring 46. This pressure is the same as that exerted against the control member 45 in the direction of the arrow F1 since the effective areas of the control member 45 and the valve disc 107 are equal. It is therefore understood that the spring 46 biasing the control member 45 is in no case affected by the speed of reciprocation of the pump body.

It will be noted that in order to satisfy the operating conditions set out above, it is mandatory for the effective section of the valve disc 107 to be at least equal to that of the piston control member 45.

The present invention is, of course, not limited to the described and illustrated embodiment but includes all modifications, variants and expedients within the scope and spirit of the invention defined by the appended claims.

What is claimed is:

1. A hand bicycle pump generally of elongate cylindrical configuration comprising a pump rod mounting a compression piston and a pump body having air inlet means and displaceable along said pump rod and defining a compression chamber with said compression piston, an air circulation tube disposed inside said pump rod and communicating at one end with said compression chamber and at the other end with means for temporarily coupling said pump to an inflatable body, pressure preselection and display means accommodated in said pump rod around said air circulation tube and accessible from outside said pump, said pressure preselection and display means adapted to vary the spring force of spring means normally biasing a piston control member towards its inflating position, said piston control member adapted to be in communication with the pressure inside the inflatable body through said coupling means, whereby in response to pressure in the inflatable body exceeding said preselected pressure said piston control member is urged away from its inflation position against the biasing force of said spring means, and valve means responsive to displacements of said piston control member for bringing said compression chamber into communication with the atmosphere when the pressure inside the inflatable body exceeds the preselected pressure.

2. A pump according to claim 1, wherein an annular chamber is formed between said piston contol member and said pressure preselection and display means, a port formed in said air circulation tube in communication with said annular chamber for maintaining the pressure on an end of said control member to prevent inadvertent, untimely displacements of said control member.

3. A pump according to claim 1, wherein said pump rod has a pair of diametrically opposed slots through which said pressure preselection and display means are adjustable.

4. A pump according to claim 1, wherein said valve means comprises a valve disc provided at said one end of said air circulation tube and a valve seat arranged in a valve body fixed to said pump rod, said valve means being adapted to control a flow path between said compression chamber and the atmosphere, said flow path being defined in said valve body and a liner associated with said pressure preselection and display means adapted to adjust the spring loading of said piston control member.

5. A pump according to claim 1, wherein said piston control member comprises a first part and a second part in continuation of each other and a sealing member clamped therebetween in sealing contact with the inner wall of said piston rod.

6. A pump according to claim 1, wherein said piston control member and said valve means are both embodied in a piston valve member inside said pump rod for axial sliding displacements along said air circulation tube.

7. A pump according to claim 6, further comprising a port in said air circulation tube and a vent in said pump rod, said piston valve member being adapted to bring said port into communication with said vent when said piston valve member is displaced from its inflation position in response to overpressure in said pump rod between said coupling means and said piston valve member.

8. A pump according to claim 1, wherein said one end of said air circulation tube is secured to a piston support member mounting said compression piston, and said other end of said air circulation tube is provided with a check valve, said piston control member being disposed proximate to said other end of said air circulation tube.

9. A pump according to claim 8, wherein said check valve has a valve body forming an abutment defining said inflation position of said piston control member.

10. A pump according to claim 9, wherein said check valve comprises a ball check valve member freely mounted in an apertured valve body, said check valve having a seat defined in said other end of said air circulation tube.

11. A pump according to claim 1, wherein said pressure preselection and display means comprises a sleeve mounted for rotation about said air circulation tube, an index disposed on said sleeve and in response to rotation thereof displaceable along a graduated scale provided along a slot formed in said pump rod facing said sleeve.

12. A pump according to claim 11, further comprising a threaded liner in threaded engagement with a tapped surface on said sleeve, said liner being fixed to a piston support member mounting said compression piston.

13. A pump according to claim 1, wherein said valve means comprises a valve disc provided at said one end of said air circulation tube and a valve body cooperable with said valve disc, fitted inside said pump rod and secured thereto, said air circulation tube being mounted for sliding movement in response to displacements of said piston control member.

14. A pump according to claim 13, wherein said valve means has a seat provided in said valve body facing said valve disc which is secured to said one end of said air circulation tube.

15. A pump according to claim 14, wherein said pump rod has a port in communication with the surroundings through said pump body said valve means normally closing a flow path between said port and said compression chamber.

16. Pump according to claim 15, wherein said flow path comprises an annular space between the periphery of said valve disc and said pump rod and radial apertures and passageways in said valve body on the other side of said valve disc from said annular space.

17. A pump according to claim 13, wherein said piston control member is connected to said other end of said air circulation tube for displacements therewith.

18. A pump according to claim 17, wherein said piston control member houses a check valve including a check valve member cooperable with said other end of said air circulation tube.

19. A pump according to claim 17, wherein said pressure preselection and display means comprises a sleeve mounted for rotating movement on a threaded liner associated with said valve body.

20. A pump according to claim 13, wherein the effective area of said valve disc is at least as large as the effective area of said piston control member.

* * * * *